Nov. 6, 1956

J. S. LUKOCEVICH 2,769,967

LOAD SIGNAL FOR VEHICLES

Filed Dec. 7, 1954

Josef S. Lukocevich
INVENTOR.

BY *Clarence A. O'Brien*
*and Harvey B. Jacobson*
Attorneys

Nov. 6, 1956
J. S. LUKOCEVICH
2,769,967
LOAD SIGNAL FOR VEHICLES
Filed Dec. 7, 1954
2 Sheets-Sheet 2
Fig. 3
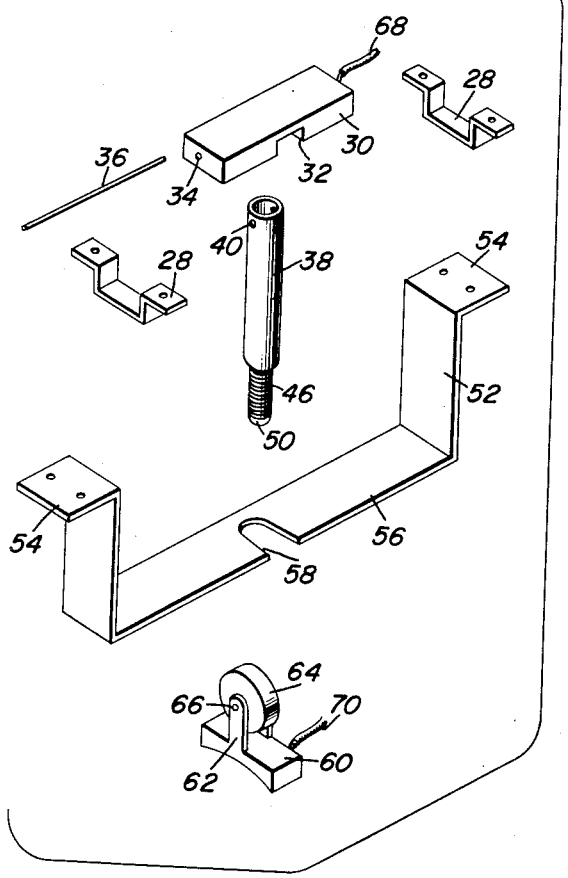
Fig. 4
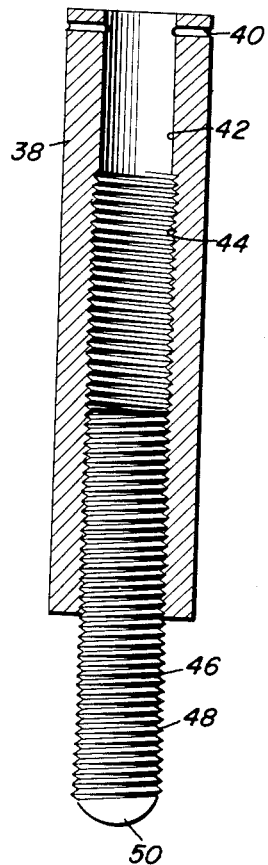
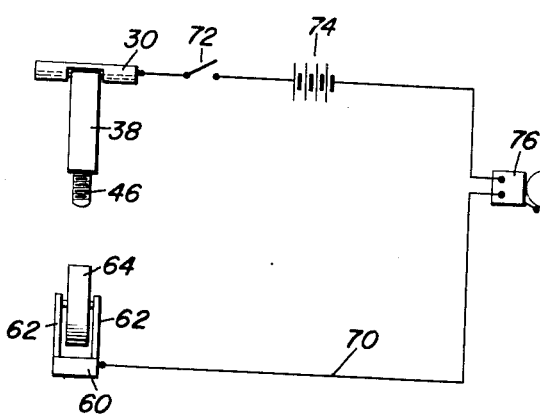
Fig. 5
Josef S. Lukocevich
INVENTOR.
BY Clarence A. O'Brien
and Harvey B. Jacobson
Attorneys United States Patent Office 2,769,967
Patented Nov. 6, 1956

2,769,967

LOAD SIGNAL FOR VEHICLES

Josef S. Lukocevich, Tallmadge, Ohio

Application December 7, 1954, Serial No. 473,567

3 Claims. (Cl. 340—52)

This invention generally relates to a load signal for vehicles and has particular utility in the determination in the weight of freight loading of motor trucks or truck and trailer combination although it may be applied to the weighing of other load carrying devices.

In recent developments of motor freight transportation, there has been a gradual increase in the tonnage carried by such trucks. In view of the deleterious effects of such heavy loads upon hard surface pavements, protective laws have been passed which set forth a maximum load dependent upon the wheels or axles carrying the load. In order to obtain higher loading for a single vehicle, recourse has been had to the multiplicity of wheels or axles wherein a greater net load may be carried without exceeding the protective laws. Heretofore, the load on a motor truck has been measured in various ways, such as by estimation, all of which are either inaccurate or too costly, for instance, individual scales at the point of loading. Accordingly, it is the primary object of the present invention to provide a load signal for motor freight carriers which may be easily adjusted and installed for giving a signal when a predetermined load has been placed on the truck thereby permitting the truck to be loaded within the legal limit of the protective law in an accurate, inexpensive, simple and dependable manner without consuming the time normally used in weighing or computing the load on the truck.

A further object of the present invention is to provide a load signal for vehicles including a signal device utilizing an incomplete circuit which is completed when a predetermined load is positioned on the spring supported load carrying portion of a vehicle thereby actuating the signal device and indicating that the load on the vehicle is at a predetermined amount.

Yet another important feature of the present invention is to provide a load signal for vehicles that may be rendered inoperative from the cab of the vehicle so that the signal will not be continuously actuated when passing over a rough road or for any other reason when the signal may be temporarily actuated.

Other important objects of the present invention will reside in its simplicity of construction, ease of installation on existing trucks, dependability, ruggedness, accurateness, adjustability, its adaptability for its purposes and its relative inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a group perspective view showing the elements of the load signal of the present invention;

Figure 4 is a longitudinal, vertical sectional view taken substantially upon a plane passing through the longitudinal center of the longitudinally adjusted rod; and Figure 5 is a diagrammatic view of the wiring diagram of the load signal of the present invention.

Figure 1:
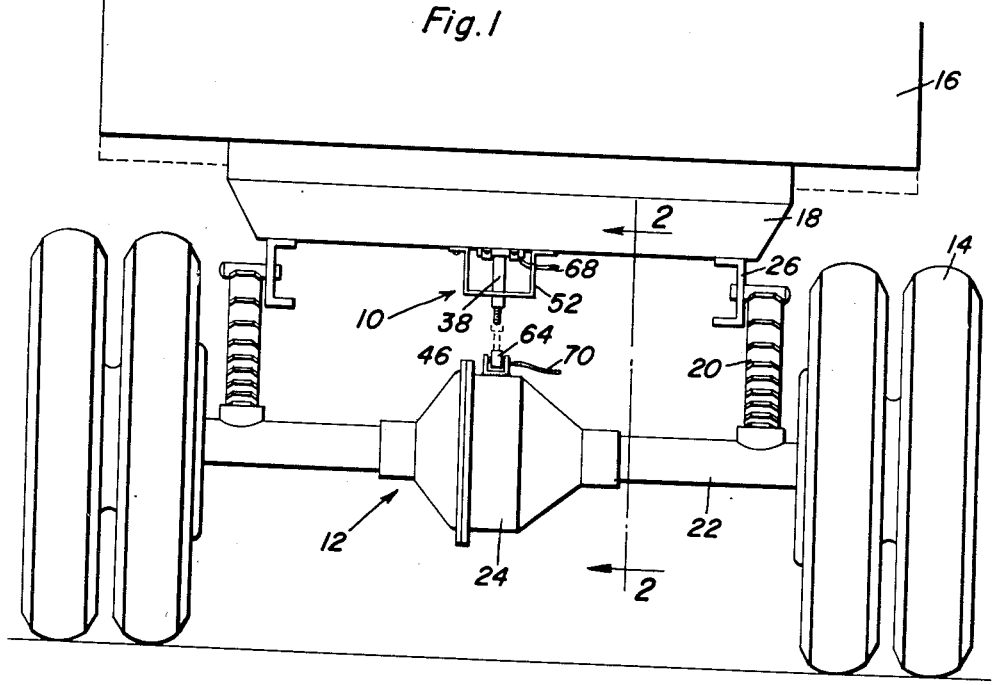
Figure 1 is a rear elevational view of a load carrying vehicle with the load signal of the present invention installed thereon.

Referring now specifically to the drawings, it will be seen that the numeral 10 generally designates the load signal of the present invention for attachment to a vehicle generally indicated by the numeral 12 wherein the vehicle 12 includes ground engaging supporting wheels 14, a load carrying body 16, a load carrying frame member 18, supporting springs 20 and a supporting axle housing 22 together with a differential housing 24. The springs 20 are secured in the center to the axle housing 22 and at each end to the longitudinal frame rails 26 in the usual manner and the supporting wheels may be of the dual or single type and the supporting body 16 may be of any well known construction. The details of the vehicle form no part of the invention and are only described to orientate and illustrate one application of the load signal 10 of the present invention.

The load signal 10 includes a pair of U-shaped brackets 28 secured to the undersurface of the transverse frame member 18 for supporting a polygonal block 30 against the undersurface thereof. The polygonal block 30 is provided with a central transverse recess 32 together with a longitudinal aperture 34 for extending an elongated pivot pin 36 completely through the block 30. Pivotally positioned in the recess 32 is the upper end of an elongated rod 38 having a transverse aperture 40 for receiving the pivot pin 36 thereby pivotally supporting the elongated rod 38 from the block 30. The elongated rod 36 is provided with a longitudinal bore 42 having internal threads 44 thereon for adjustably receiving a projecting finger 46 that is externally threaded as indicated by the numeral 48 and rounded on the outer end thereof as indicated by the numeral 50.

Figure 2:
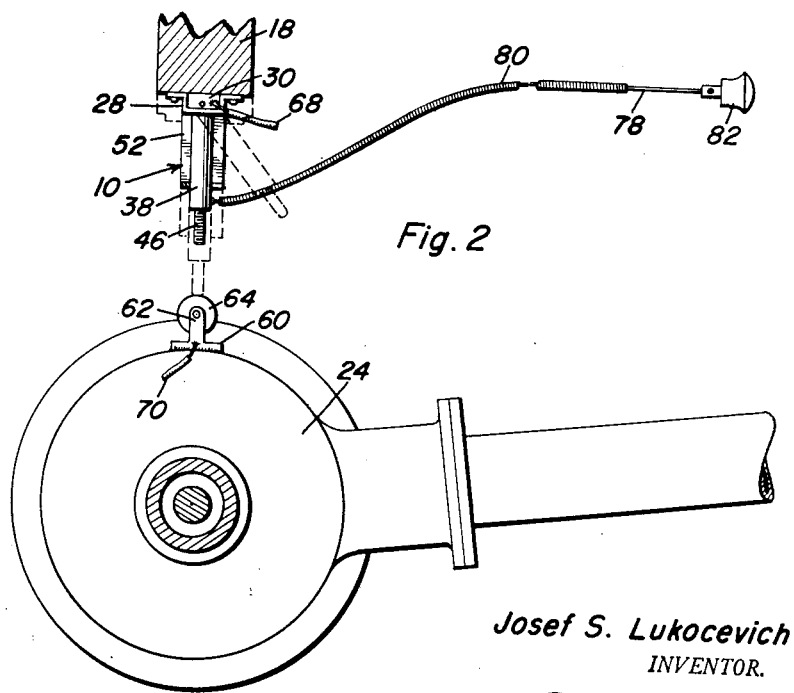
Figure 2 is a vertical, sectional view taken substantially upon a plane passing along section line 2—2 of Figure 1 showing the relationship of the load signal and the vehicle construction.

An enlarged U-shaped member 52 having outwardly extending attaching flanges 54 at the outer end thereof is secured to the undersurface of the transverse frame member in bridging relation to the U-shaped bracket 28 wherein the bight portion 56 of the U-shaped member 52 underlies and parallels the block member 30. The bight portion 56 of the U-shaped member 52 is provided with an open sided notch 58 in one edge thereof for receiving and guiding the elongated tubular rod 38. The open sided notch 58 permits the elongated tubular rod 38 to pivot about the pivot pin 36 towards the front of the vehicle to an inoperative position as illustrated in Figure 2. The bottom of the slot 58 limits the pivotal movement of the tubular rod 38 to a vertical position for actuation of the load signal.

Secured to the upper surface of the differential housing 24 is a bracket 60 having a pair of upstanding lugs 62 thereon for rotatably supporting an abutment roller 64 on a transverse pin 66 wherein the abutment roller 64 is positioned in the path of movement of the tubular rod 38 so that the rounded end 50 of the projecting threaded member 46 will engage the abutment roller 64 when the desired amount of load has been positioned in the body 16 thereby lowering the body 16 a predetermined amount for contacting the rounded end 50 of the threaded member 46 against the abutment roller 64.

An electrical conductor 68 is secured to the block 30 and another electrical conductor 70 is secured to the bracket 60. The electrical conductor 68 is connected through a switch 72 to a battery 74 and to one terminal of a signal bell 76. The other electrical conductor 70 is connected directly to the other terminal of the signal bell 76 wherein contact of the elongated tubular rod 38 with the abutment roller 64 will close the circuit thereby actuating the signal bell 76. It will be understood that the various elements of the block 30, pivot pin 36, tubular rod 38, threaded member 46, abutment roller 64, and bracket 60 are all constructed of conductive material and the various elements may be insulated from the vehicle 12 by any suitable means.

As illustrated in Figure 2, an elongated flexible cable 78 housed within a coil spring housing 80 is attached to the outer surface of the elongated tubular rod 38 and the flexible cable 78 terminates in a control knob 82 that may be positioned within the cab of the vehicle 12 adjacent the control panel thereof for pivoting the tubular rod 38 to an inoperative angular position so that it will not contact the abutment roller 64 thereby eliminating actuation of the signal device 10 when the truck has been loaded and is proceeding over rough road wherein the signal device would be intermittently actuated.

In operation, the load signal 10 is positioned in the operative position wherein the tubular rod 38 is vertically depending from the frame members 18 and 20 towards the abutment roller 64. By adjusting the threaded member 46 telescopically within the tubular rod 38, the effective length of the tubular rod 38 may be adjusted thereby determining the amount of downward movement of the body 16 before actuation of the signal device 76. This will determine the load within the body 16 as the amount of downward movement of the body 16 is directly dependent upon the load positioned therein. As the body 16 moves downwardly, the member 46 engages the abutment roller 64 thereby actuating the signal device 76 and indicating that the maximum allowed load is now on the vehicle 12. The roller 64 will deflect the rounded end 50 of the threaded member 46 to the forward side of the abutment roller 64 thereby preventing damage to the load signal 10 in the event the vehicle 12 is overloaded. The open sided notch 58 permits pivotal movement of the elongated tubular rod 38. After the truck has been loaded, the load signal 10 may be rendered inoperative by pulling the control knob 82 on the control cable 78 thereby angulating the elongated rod 38 as indicated by dotted lines in Figure 2.

While a single embodiment of the above invention has been illustrated, it will be readily understood that other types of supporting means may be provided for pivotally supporting the tubular rod 38 although it is necessary to pivotally support the rod 38 and normally dispose the rod 38 in a vertically depending position for engagement with the abutment roller 64.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A load signal for attachment between a running gear assembly and the spring supported load carrying portion of a vehicle comprising a bracket adapted to be attached to the load carrying portion of the vehicle, an elongated rod pivotally projecting from said bracket towards the running gear assembly of the vehicle, an electrical conductor connected to said rod, an abutment member mounted on the running gear assembly of the vehicle in the path of movement of said rod, an electrical conductor connected to said abutment member, means for supplying electrical energy, and a signal device interconnecting the ends of the conductors whereby the contact of the rod and abutment member completes the circuit and actuates the signal device, said abutment member having a rounded upper surface for pivotally deflecting the rod to the side when the rod contacts the abutment member.

2. A load signal for attachment between a frame and the spring supported load carrying portion of a vehicle comprising a bracket adapted to be attached to the load carrying portion of the vehicle, an elongated rod projecting from said bracket towards the frame of the vehicle, an electrical conductor connected to said rod, an abutment member mounted on the frame of the vehicle in the path of movement of said rod, an electrical conductor connected to said abutment member, means for supplying electrical energy, and a signal device interconnecting the ends of the conductors whereby the contact of the rod and abutment member completes the circuit and actuates the signal device, said rod being pivotally attached to and depending from said bracket, and a flexible control cable attached to said rod for pivoting the rod to an inoperative position, said control cable terminating remotely from the rod adjacent the vehicle controls.

3. A load signal for indicating movement of a load carrying portion of a vehicle towards the running gear portion of a vehicle comprising a bracket adapted to be mounted on one of the portions, an elongated rod pivotally mounted on said bracket and normally extending towards the other of the portions, an abutment mounted on the other of the portions of the vehicle in alignment of the rod, a signal device, an energized electrical circuit connected to said signal device and said rod and abutment whereby movement of the one portion of the vehicle towards the other portion of the vehicle will move the rod into engagement with the abutment for completing the electrical circuit and actuating the signal device, said abutment being rounded for deflecting said rod laterally when the free end thereof moves beyond the point contact with the abutment, and remote means for pivoting said rod to an inoperative position in misalignment with said abutment.

References Cited in the file of this patent

UNITED STATES PATENTS

| | | |
|---|---|---|
| 1,168,370 | Anderson | Jan. 18, 1916 |
| 1,429,411 | Davidson | Sept. 19, 1922 |
| 2,181,277 | Labbe | Nov. 28, 1939 |
| 2,586,137 | Yoder et al. | Feb. 19, 1952 |

FOREIGN PATENTS

| | | |
|---|---|---|
| 57,349 | Denmark | Mar. 4, 1940 |